United States Patent [19]

Otomo et al.

[11] Patent Number: 4,891,278
[45] Date of Patent: Jan. 2, 1990

[54] FERROMAGNETIC THIN FILM AND MAGNETIC HEAD USING IT

[75] Inventors: Shigekazu Otomo, Sayama; Ryoichi Nakatani, Akigawa; Noriyuki Kumasaka, Ome; Noritoshi Saito; Toshio Kobayashi, both of Tokyo; Masahiko Fujishiro, Katsuta, all of Japan

[73] Assignee: Hitachi, Ltd., Tokyo, Japan

[21] Appl. No.: 16,402

[22] Filed: Feb. 19, 1987

[30] Foreign Application Priority Data

Feb. 21, 1986 [JP] Japan .................................. 61-35146
Mar. 28, 1986 [JP] Japan .................................. 61-68325

[51] Int. Cl.$^4$ .............................................. G11B 5/127
[52] U.S. Cl. .................................. 428/681; 428/692; 428/928
[58] Field of Search ............... 428/606, 607, 928, 611, 428/900, 692, 693, 681, 682, 635; 148/306, 310, 311

[56] References Cited

U.S. PATENT DOCUMENTS

3,375,091 3/1968 Feldtkeller ........................... 428/928
4,103,315 7/1978 Hempstead et al. ................. 428/928
4,610,935 9/1986 Kumasaka ............................ 428/928

FOREIGN PATENT DOCUMENTS

0144150 6/1985 European Pat. Off. .
84407 5/1984 Japan .

OTHER PUBLICATIONS

*Zeitschrift fur Angewandte Physik*, vol. 26, No. 2, Feb. 1969, pp. 141–145, H. Hoffman et al, "Die Abhängigkeit der Sättigungsmagnetostriktion von der Legierungszusammensetzung ferromagnetischer Aufdampfschichten".

Landolt-Börnstein: "Zahlenwerk und Funktionen aus Physik, Chemie, Astromonie, Geophysik und Technik", 6th ed., Eigenschaften der Materie in ihren Aggregatzuständen, part 9, 'Magnetische Eigenschaften', 1962, pp. 1-129–1-133.

Dorleijn, J. W. F., Electrical Conduction in Ferromagnetic Metals, Chemical Abstracts Abstract No. 87:14647z, 1976.

V. E. Rode et al., Magnetic Properties of Iron Alloys with Nickel and Ruthenium, Chemical Abstracts Abstract No. 95:179826k, 1981.

High Strength Electrolytic Iron Foil, Chemical Abstracts Abstract No. 100:14509t, 1983.

*Primary Examiner*—John J. Zimmerman
*Attorney, Agent, or Firm*—Antonelli, Terry & Wands

[57] ABSTRACT

A ferromagnetic thin film containing Fe as a main component and at least one additive element selected from the group consisting of Co, Ni, Ru, Rh, Pd, Os, Ir and Pt, in which the total content of the at least one additive element is not less than 0.1 at % and additive contents, a, b, c, d, e, f, g and h (at %) respectively of said Co, Ni, Ru, Rh, Pd, Os, Ir and Pt satisfy $$\frac{a}{4} + \frac{b}{3.5} + \frac{c}{10} + \frac{d}{7} + \frac{e}{13} + \frac{f}{11} + \frac{g}{8} + \frac{h}{2.5} < 1.$$

The ferromagnetic thin film thus disclosed has a high saturation flux density of 18 KG or more, a magnetostriction constant close to zero, and excellent corrosion resistance. There is also disclosed a magnetic head using the above described ferromagnetic thin film in at least a part of a magnetic circuit thereof.

25 Claims, 5 Drawing Sheets

FERROMAGNETIC THIN FILM AND MAGNETIC HEAD USING IT

BACKGROUND OF THE INVENTION

The present invention relates to a ferromagnetic thin film having saturation flux density, a magnetostriction constant close to zero and fine corrosion resistance, and comprising Fe as its main component. And the present invention also relates to a magnetic head using such a ferromagnetic thin film.

In recent years, high density magnetic recording has been developed significantly. Especially, the advent of the perpendicular magnetic recording system is significantly improving the recording density. Since a part of the single pole type magnetic head for perpendicular magnetic recording is formed by an extremely thin main pole, magnetic saturation tends to occur at the tip of the main pole. To prevent this, a magnetic thin film having an extremely high saturation flux density is desired. In a conventional head for VTR as well, the increase in recording density tends to reduce the gap length and increase the coercive force of the recording medium. In order to sufficiently record/reproduce a signal onto/from a recording medium by using such a magnetic head, a magnetic material having a high saturation flux density is desired.

Further, in a thin film magnetic head used in the computer memory or the like, the film thickness at the tip of the magnetic pole must be made thin in order to increase the recording density. In order to prevent the magnetic saturation at the tip of the magnetic pole, therefore, a magnetic thin film having a high saturation flux density is desired.

As the material for head core, the ferrite materials such as Mn-Zn ferrite and the alloy materials such as Ni-Fe alloys (permalloy) and Fe-Al-Si alloys (sendust) have heretofore been put into practical use. All of these materials are approximately 10 KG or less in saturation flux density, resulting in a drawback that they cannot be used for high density recording and reproducing.

In recent years, therefore, the crystalline alloys of Fe-Ti alloy, amorphous alloys comprising Co as the main component and elements such as Zr, Ti, Hf, Nb or Ta as the glass forming element, and the like have undergone research and development. These alloys are approximately 14 KG or less in saturation flux density.

In general, alloys of Fe-Si family are known as materials of high saturation flux density. An alloy containing approximately 6.5 wt% (12 at%) of Si has a magnetostriction constant close to zero and a high saturation flux density close to 18 KG and is considered to be promising as a high Bs head material (JP-A-59-78503). Since the alloy of Fe-Si has poor corrosion resistance, however, rust is unadvantageously incurred during the head production process or during the use of the head.

SUMMARY OF THE INVENTION

In order to satisfy the above described demand, an object of the present invention is to provide a ferromagnetic thin film having a high saturation flux density of 18 KG or more, a magnetostriction constant close to zero, and excellent corrosion resistance, and provide a magnetic head using such a ferromagnetic thin film.

In order to achieve the above described object, the present invention proposes a ferromagnetic thin film containing Fe as the main component and containing at least one element selected from the group consisting of Co, Ni, Ru, Rh, Pd, Os, Ir and Pt, the total content of the at least one additive element being 0.1 at% or more, and also proposes a magnetic head using such a ferromagnetic thin film. Assuming that contents of Co, Ni, Ru, Rh, Pd, Os, Ir and Pt are respectively represented by a, b, c, d, e, f, g and h (at%), those contents are so defined as to satisfy the relation.

$$\frac{a}{4} + \frac{b}{3.5} + \frac{c}{10} + \frac{d}{7} + \frac{e}{13} + \frac{f}{11} + \frac{g}{8} + \frac{h}{2.5} < 1.$$

As for the magnetic characteristics obtained when the above described elements are added to Fe, the saturation flux density were examined. Other properties such as the magnetostriction constant are not known excepting the case where Co and Ni are added to Fe. Further, the changes in magnetostriction constant of the thin film which may be caused due to use of an alloy containing Fe and the above-mentioned additive(s) as the thin film are not known, either. The corrosion resistance of the thin film material is considered to be different from that of the bulk material. However, little is known about this.

The present inventors made a magnetic thin film comprising Fe as the main component and comprising various additive elements, and measured characteristics such as the saturation flux density, magnetostriction constant and corrosion resistance. The results of the measurement will now be described. When a non-magnetic element is added, the saturation flux density decreases with the increase in additive content. When Co, Ni, Ru, Rh, Pd, Os, Ir or Pt is added, however, the saturation flux density decreases slightly or increases. The magnetostriction constant $\lambda s$ of Fe has a large negative value close to $-4 \times 10^{-6}$. Accordingly, it is difficult to use Fe as it is as the magnetic head material. However, the present inventors found that the magnetostriction constant could be made a value close to zero by adding Co, Ni, Ru, Rh, Pd, Os, Ir or Pt. Further, it was also made clear that the magnetic film with the above described element added is extremely excellent also in corrosion resistance. By controlling the contents of these additives, therefore, it is possible to obtain an excellent ferromagnetic thin film having a high saturation flux density, fine corrosion resistance and a magnetostriction constant close to zero. Since Ru, Rh, Pd, Os, Ir and Pt are expensive metals, a ferromagnetic thin film can be produced at moderate prices by mainly adding Co or Ni. If the above described ferromagnetic thin film is used for a magnetic core in a magnetic head for perpendicular magnetic recording, a thin film magnetic head or a magnetic head for VTR, excellent recording and reproducing characteristics are obtained.

Further, by alternately laminating the main magnetic film composed of the ferromagnetic thin film according to the present invention and an intermediate layer of a magnetic film or a non-magnetic film having other composition, a magnetic film having a small coercive force, high permeability and excellent magnetic characteristics.

A ferromagnetic thin film according to the present invention can be made by a thin film forming technique such as the vacuum deposition method, the plating method, the chemical vapour deposition method (CVD method) or the sputtering method. Among those methods, the sputtering method such as the high frequency sputtering method, the magnetron sputtering method, or the ion beam sputtering method is suited for realization of a ferromagnetic thin film having uniform composition and excellent characteristics.

DESCRIPTION OF THE PREFERRED EMBODIMENTS

Embodiments of the present invention will now be described by referring to drawings.

EMBODIMENT 1

A ferromagnetic thin film of Fe-Ni alloy was made by using an RF-diode sputtering apparatus. A target which was used to obtain a thin film having predetermined alloy composition was composed of a Fe disk having a size of 150 mm$\phi \times$ 3 mm$^t$ and a Ni pellet having a size of 5 mm $\times$ 5 mm $\times$ 1 mm$^t$ stuck onto the Fe disk. Sputtering was carried out under the following conditions.

High-frequency power density: 2.8 W/cm$^2$
Argon pressure: 5 $\times$ 10$^{-3}$ Torr
Substrate temperature: 300° C.
Distance between electrodes: 45 mm As for the substrate, a photoceram substrate produced by Corning was used for the measurement of the magnetostriction constant and Model 7059 glass substrate produced by Corning was used for the measurement of other magnetic characteristics and corrosion resistance. The film thickness was made to have a constant value of 1.5 μm.

Figure 1:
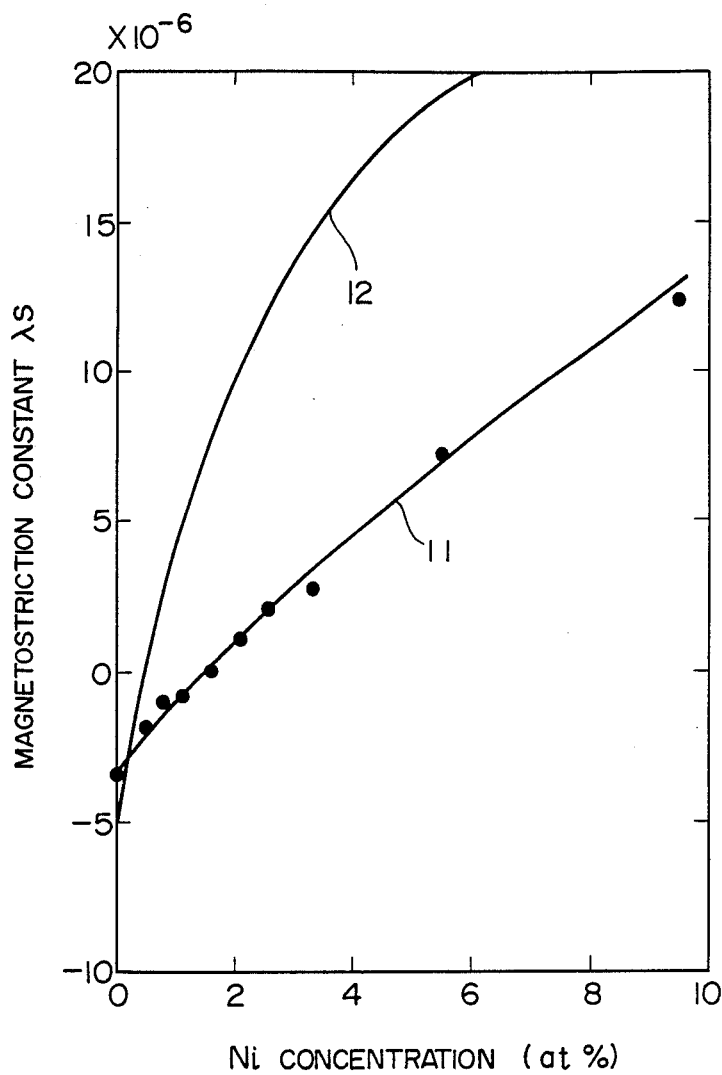
FIG. 1 is a characteristic diagram for illustrating the relationship between the additive content of a thin film made of a Fe-Ni alloy and its magnetostriction constant.

The magnetostriction constant λs of a Fe-Ni binary alloy thin film produced under the above described conditions was measured as a function of the composition. The result of the measurement is represented by a solid line 11 of FIG. 1. The λs values of a bulk material of a Fe-Ni alloy measured by R. M. Bozorth are also represented by a solid line 12 in FIG. 1. As shown in FIG. 1, the value of λs of the thin film according to the present invention is largely different from that of the bulk material of the prior art in the composition range of the Fe-Ni binary alloy where the Ni content is 10 at% or less. When the absolute value |λs| of the magnetostriction constant λs of the thin film is desired to be 2$\times$10$^{-6}$ or less, the Ni composition must be defined to be in the range of 0.5 to 2.6 at%. When |λs| is desired to be 1$\times$10$^{-6}$ or less, the Ni composition must be defined to be in the range of 1.1 to 2.1 at%. The magnetic characteristics of the alloy of Fe-0.5 to 2.6 at% Ni according to the present embodiment are shown in Table 1.

TABLE 1

| Ni content (at %) | Magnetostriction constant λs | Saturation flux density Bs (KG) | Coercive force Hc (Oe) | Initial permeability μ: at 5 MHz |
|---|---|---|---|---|
| 0.5 | $-2.0 \times 10^{-6}$ | 21.0 | 2.5 | 600 |
| 0.8 | $-1.1 \times 10^{-6}$ | 21.0 | 2.3 | 650 |
| 1.1 | $-0.9 \times 10^{-6}$ | 20.9 | 2.3 | 650 |
| 1.6 | 0 | 20.9 | 2.1 | 700 |
| 2.1 | $1.0 \times 10^{-6}$ | 20.8 | 2.3 | 650 |
| 2.6 | $2.0 \times 10^{-6}$ | 20.8 | 2.6 | 600 |

As shown in Table 1, the thin film of the Fe-Ni binary alloy has the saturation flux density of 20 KG or more in the Ni composition range of 0.5 to 2.6 at%. In the present embodiment, the alloy composition having the most excellent magnetic characteristics is represented by Fe-1.6 at% Ni. The magnetic characteristic values of this alloy are represented as: magnetostriction constant λs=0; saturation flux density Bs=20.9 KG; coercive force Hc=2.1 Oe; and initial permeability at measurement frequency 5 MHz μ=700.

In order to examine the corrosion resistance, the saturation magnetization M$_0$ of the above described Fe-1.6 at% Ni alloy was measured at first and a water solution of 0.5% NaCl was sprayed onto the surface of the film. After the alloy was conditioned at the room temperature for 24 hours, the saturation magnetization M$_1$ was measured. The corrosion rate (%) was defined as (M$_0$-M$_1$)$\times$100/M$_0$. For the purpose of comparison, a corrosion resistance test similar to the above described test was conducted also for the Fe-12.5 at% Si alloy thin film (Bs=18 KG) which has heretofore been attempted to be applied to magnetic heads. The result of the corrosion resistance test is shown in Table 2.

TABLE 2

| | Magnetic thin film material | Corrosion rate (%) |
|---|---|---|
| Embodiment | Fe-1.6 at % Ni | 0 |
| Comparative example | Fe-12.5 at % Si | 28 |

As shown in Table 2, the Fe-1.6 at% Ni alloy was excellent in corrosion resistance and the corrosion rate was 0%. Even three weeks after the salt spray, the Fe-1.6 at% Ni alloy did not corrode at all. Excellent corrosion resistance was thus confirmed.

EMBODIMENT 2

Figure 2A:
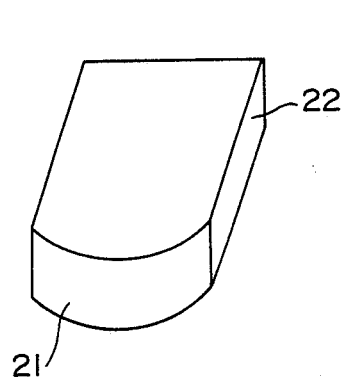
FIGS. 2A and 2B are oblique views for illustrating an example of a dummy head used for a wear test.
Figure 2B:
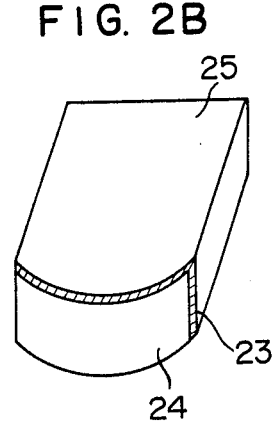

In order to examine the effect of the addition of Ru, Rh, Pd, Os, Ir or Pt on the wear resistance, a dummy head was made to undergo the wear resistance test. A ferrite substrate 22 was so prepared as to be provided with thickness of 15 mm and a curved face 21 having radius of 20 mm as shown in FIG. 2A. A sputter film 23 having thickness of 10 μm was formed on the curved face 21 to produce a dummy head 25 for wear resistance measurement as shown in FIG. 2B. The target used for this sputtering was formed by sticking one kind of pellet (5 mm$\times$5 mm$\times$1 mm$^t$) comprising an additive element Ru, Rh, Pd, Os, Ir or Pt per sputtering trial onto a target similar to that of the embodiment 1. The sputter film 23 is formed by adding the above described additive element by 0.6 at% to 1.1 at% to the alloy composition of Fe-1.6 at% Ni having the most excellent magnetic characteristics in the embodiment 1.

In the wear resistance test, metal tape was rubbed against the curved face 24 of the sputter film as shown in FIG. 2B at a speed of 30 cm/s for 200 hours and the amount of wear was measured. The result of this wear resistance test is shown in Table 3.

TABLE 3

| Additive element | Additive content (at %) | Amount of wear (μm) |
|---|---|---|
| None | 0 | 2.8 |
| Ru | 1.1 | 2.4 |
| Rh | 1.1 | 2.1 |
| Pd | 1.1 | 1.9 |
| Os | 0.6 | 2.5 |
| Ir | 0.6 | 2.5 |
| Pt | 0.6 | 2.3 |

When any one kind of element is added, the wear resistance is improved as compared with when the additive element is absent as shown in Table 3.

EMBODIMENT 3

Sputter films were made respectively by adding Co, Ni, Ru, Rh, Pd, Os, Ir and Pt to Fe in an RF-diode sputtering apparatus. Combination targets used as the target were made by sticking pellets respectively comprising Co, Ni, Ru, Rh, Pd, Os, Ir and Pt of 5 mm square to a target of pure Fe or by sticking pellets of alloys comprising respective elements and Fe to the target. The argon pressure $5 \times 10^{-3}$ Torr, high-frequency power density 23 kw/m², substrate temperature 350° C., and film thickness approximately 1 μm were used as the conditions for sputtering. As the substrate, #7059 glass produced by Corning, U.S.A. was used.

Figure 3A:
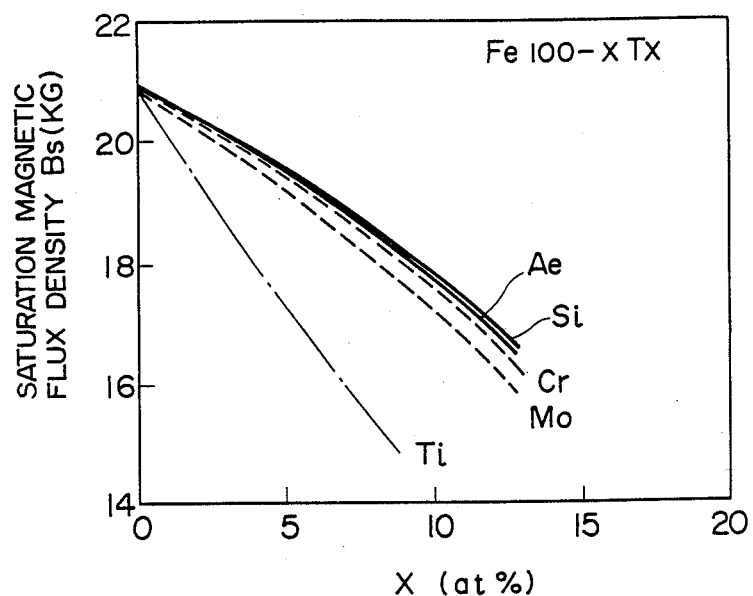
FIG. 3A is a characteristic diagram for illustrating a comparison with the present invention and illustrates the saturation flux density Bs as a function of additive content of an element when a thin film is formed by adding Al, Si, Cr, Mo or Ti to Fe.
Figure 3B:
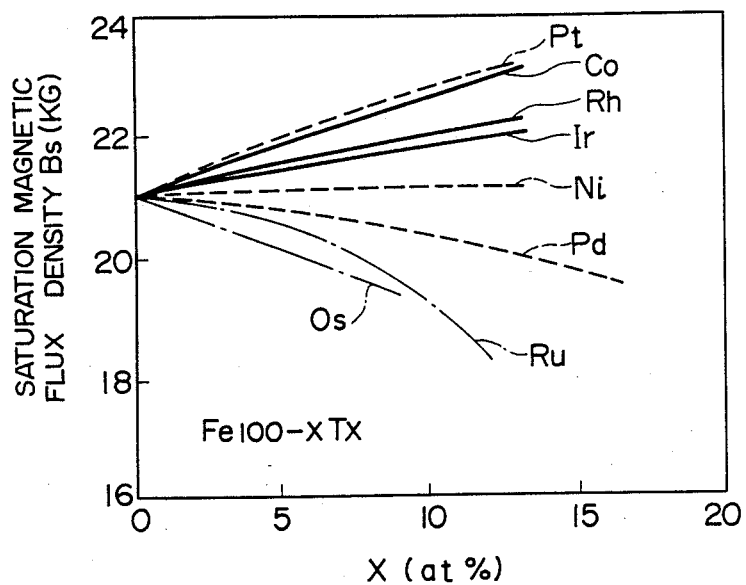
FIG. 3B is a characteristic diagram for illustrating an embodiment of the present invention and illustrates the saturation flux density Bs as a function of additive content of an element when a thin film is formed by adding Co, Ni, Ru, Rh, Pd, Os, Ir or Pt to Fe.

FIGS. 3A and 3B show the saturation flux density Bs as functions of the additive element content x. FIG. 3A shows a case where Al, Si, Cr, Mo or Ti is added for the purpose of comparison. When such a non-magnetic element was added, Bs largely decreased with the increase in additive content as shown in FIG. 3A. The decrease in Bs was large especially when a transition element such as Ti or Mo was added. FIG. 3B shows a case where an element of VIII family such as Co, Ni, Ru, Rh, Pd, Os, Ir and Pt is added. It is evident from FIG. 3B that Bs decreases by the addition of Pd, Ru or Os. However, the decrease rate is smaller than the case where the element shown in FIG. 3A is added. When Ni, Ir, Rh, Co or Pt is added, Bs increases with the increase in additive content. When the additive element of the present invention is used, therefore, it is possible to obtain a magnetic film having extremely high Bs.

Figure 4:
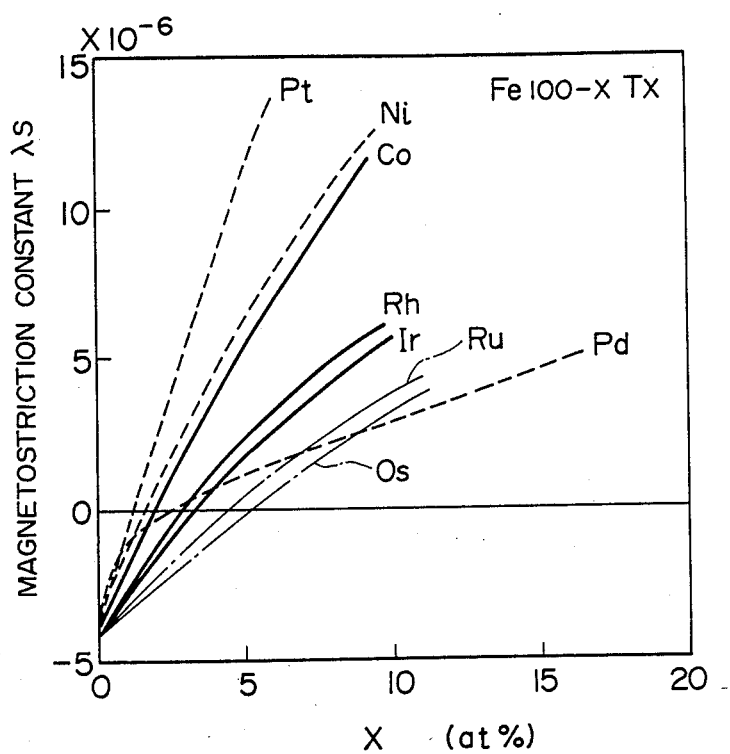
FIG. 4 is a characteristic diagram for illustrating an embodiment of the present invention and illustrates the magnetostriction constant λs as a function of additive content of an element when a thin film is formed by adding Co, Ni, Ru, Rh, Pd, Os, Ir or Pt to Fe.

FIG. 4 shows the change of the magnetostriction constant obtained when the additive element according to the present invention is added. As shown in FIG. 4, the magnetostriction constant λs of the pure Fe sputter film was approximately $-4 \times 10^{-6}$. When the additive element was added, λs approached zero and then increased in the positive value as the additive content was increased. It is desirable for the magnetic head material to add these elements by a small amount because it makes λs approach zero. For obtaining the effect of the addition of these elements, additive concentration of 0.1 at% in total is necessary. However, it is not desirable to add a large amount because the absolute value of λs exceeds the value $|λs| = 4 \times 10^{-6}$ obtained when no element is added. For satisfying the condition $|λs| < 4 \times 10^{-6}$ in FIG. 4, therefore, respective additive contents a, b, c, d, e, f, g and h at% of Co, Ni, Ru, Rh, Pd, Os, Ir and Pt must exist in the composition range satisfying the relation $$\frac{a}{4} + \frac{b}{3.5} + \frac{c}{10} + \frac{d}{7} + \frac{e}{13} + \frac{f}{11} + \frac{g}{8} + \frac{h}{2.5} < 1.$$

It is desirable for the magnetic head material that the absolute value of the magnetostriction constant is further small. For satisfying the condition that $|λs| \leq 2 \times 10^{-6}$, the composition range must satisfy the relation $a + b/0.5 + c/2 + d/1.4 + e/0.5 + f/1.5 + g/1.6 + h/0.5 \geq 1$ and the relation $a/3 + b/2.6 + c/7 + d/4.6 + e/7 + f/8 + g/5 + h/2 \leq 1$.

EMBODIMENT 4

Alloy thin films were made by adding more than one kind out of Co, Ni, Ru, Rh, Pd, Os, Ir and Pt to Fe in accordance with a method similar to that of the embodiment 3. Table 4 shows the saturation flux density Bs and the magnetostriction constant λs of these thin films.

TABLE 4

| | Composition (at %) | Bs (KG) | λs |
|---|---|---|---|
| Conventional example | Fe$_{100}$ | 21 | $-4 \times 10^{-6}$ |
| | Fe$_{88}$Si$_{12}$ | 18 | $0.2 \times 10^{-6}$ |
| Alloy thin film of the present invention | Fe$_{98}$Co$_1$Ni$_1$ | 21.2 | $+0.5 \times 10^{-6}$ |
| | Fe$_{96.5}$Co$_{1.5}$Ru$_2$ | 20.8 | $+1 \times 10^{-6}$ |
| | Fe$_{98}$Co$_{0.5}$Rh$_{1.5}$ | 21.2 | $-0.2 \times 10^{-6}$ |
| | Fe$_{98}$Co$_1$Pd$_1$ | 21.1 | $+0.8 \times 10^{-6}$ |
| | Fe$_{97}$Co$_{0.5}$Os$_{2.5}$ | 20.6 | $-0.5 \times 10^{-6}$ |
| | Fe$_{97.5}$Co$_1$Ir$_{1.5}$ | 21.3 | $+0.3 \times 10^{-6}$ |
| | Fe$_{98.5}$Co$_1$Pt$_{0.5}$ | 21.1 | $+0.2 \times 10^{-6}$ |
| | Fe$_{97}$Ni$_1$Ru$_2$ | 20.8 | $+1 \times 10^{-6}$ |
| | Fe$_{97.5}$Ni$_1$Rh$_{1.5}$ | 21.3 | $+0.2 \times 10^{-6}$ |
| | Fe$_{98}$Ni$_1$Pd$_1$ | 21.9 | $+1.2 \times 10^{-6}$ |
| | Fe$_{97.5}$Ni$_{1.5}$Os$_1$ | 20.8 | $+0.8 \times 10^{-6}$ |
| | Fe$_{97.5}$Ni$_{1.5}$Ir$_1$ | 21.2 | $+1.2 \times 10^{-6}$ |
| | Fe$_{99}$Ni$_{0.5}$Pt$_{0.5}$ | 21.1 | $-0.2 \times 10^{-6}$ |
| Alloy thin film of the present invention | Fe$_{97}$Ru$_2$Rh$_1$ | 20.9 | $+0.5 \times 10^{-6}$ |
| | Fe$_{96.5}$Ru$_3$Pd$_{0.5}$ | 20.7 | $+1.5 \times 10^{-6}$ |
| | Fe$_{97}$Ru$_2$Os$_1$ | 20.8 | $-1.0 \times 10^{-6}$ |
| | Fe$_{97}$Ru$_1$Ir$_2$ | 20.9 | $-0.2 \times 10^{-6}$ |
| | Fe$_{97.5}$Ru$_2$Pt$_{0.5}$ | 21.0 | $+1.0 \times 10^{-6}$ |
| | Fe$_{97}$Rh$_2$Pd$_1$ | 21.1 | $+1.5 \times 10^{-6}$ |
| | Fe$_{97.5}$Rh$_2$Os$_{0.5}$ | 21.2 | $-0.5 \times 10^{-6}$ |
| | Fe$_{97}$Rh$_{1.5}$Ir$_{1.5}$ | 21.3 | $+0.2 \times 10^{-6}$ |
| | Fe$_{97.5}$Rh$_{1.5}$Pt$_1$ | 21.3 | $+1.2 \times 10^{-6}$ |

As shown in Table 4, the magnetostriction constant of the Fe thin film was $-4 \times 10^{-6}$ and hence had a large absolute value. Although the conventional Fe-Si alloy thin film had a magnetostriction constant close to zero at composition of Si 12 at%, Bs decreased to approximately 18 KG. In the ferromagnetic thin film according to the present invention, however, the magnetostriction constant could be made close to zero by adding a small amount of Co, Ni, Ru, Rh, Pd, Os, Ir and Pt. And it was possible to obtain extremely high Bs not less than 20 KG.

EMBODIMENT 5

The corrosion resistance of a sputter film made by a method similar to that of the embodiment 3 was evaluated by using a high temperature, high humidity test. The sample was conditioned in a high temperature, high humidity atmosphere of 60° C. and 90% for 340 hours (i.e., two weeks). From the saturation magnetization before the conditioning $M_0$ and the saturation magnetization after the conditioning M, the corrosion rate was derived as the change ratio $(M_0-M)/M_0$. The test result is shown in Table 5.

TABLE 5

| | Composition (at %) | Corrosion rate (%) |
|---|---|---|
| An example to be compared | Fe | 0 |
| | $Fe_{88}Si_{12}$ | 95 |
| | $Fe_{98}Si_2$ | 90 |
| | $Fe_{95}Ti_5$ | 85 |
| | $Fe_{95}Mo_5$ | 95 |
| | $Fe_{95}Co_5$ | 0 |
| | $Fe_{95}Ni_5$ | 0 |
| Ferromagnetic thin film according to the present invention | $Fe_{95}Ru_5$ | 0 |
| | $Fe_{95}Rh_5$ | 0 |
| | $Fe_{95}Pd_5$ | 0 |
| | $Fe_{95}Os_5$ | 0 |
| | $Fe_{95}Ir_5$ | 0 |
| | $Fe_{95}Pt_5$ | 0 |

As shown in Table 5, the pure Fe sputter film exhibited favorable corrosion resistance as a result of this test method. Even after the test, the surface of the sample exhibited the metallic luster. In case where Si, Ti or Mo had been added to Fe, the corrosion resistance was significantly deteriorated by the addition of a small amount, and red rust was generated over the entire surface of the sample after the test. In the sputter film with Co, Ni, Ru, Rh, Pd, Os, Ir or Pt added according to the present invention, corrosion was not generated at all and favorable corrosion resistance was exhibited. Table 5 shows the case where the additive content is 5%. In case the additive content was 1% and 10% as well, corrosion was not generated at all.

EMBODIMENT 6

It is effective in improving the magnetic characteristics to alternately laminate main magnetic films composed of ferromagnetic thin films having the composition of the present invention and intermediate layers composed of a magnetic material having other composition or a non-magnetic material. As an example, a laminate film including $Fe_{97}Rh_3$ as the main magnetic material as well as $SiO_2$ and permalloy as the intermediate layer was produced. In this example, the main magnetic material was 0.1 μm in film thickness and the intermediate layer was 30 Å in film thickness. The total film thickness was 1 μm. The main magnetic material films and the intermediate layers were produced under the condition similar to that of the embodiment 3. Table 6 shows the magnetic characteristics of these films.

TABLE 6

| Intermediate layer | Hc (Oe) | Permeability (5 MHz) |
|---|---|---|
| Single layer | 2.5 | 800 |
| $SiO_2$ | 0.8 | 1800 |
| Permalloy (Ni-19 wt % Fe) | 0.6 | 2300 |

When a non-magnetic material $SiO_2$ and a magnetic material permalloy were used for the intermediate layer, Hc was lowered and the permeability was significantly improved as shown in Table 6 as compared with the single layer having the composition of $Fe_{97}Rh_3$. The effect of the present embodiment was significantly noticed when the film thickness of the main magnetic material fell in the range of 0.02 to 0.5 μm and the film thickness of the intermediate layer fell in the range of 20 to 500 Å.

EMBODIMENT 7

Figure 5A:
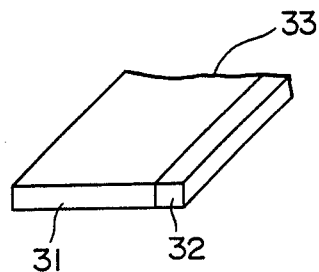
FIGS. 5A to 5E are oblique views for illustrating the production method of a magnetic head to show an embodiment of the present invention.
Figure 5B:
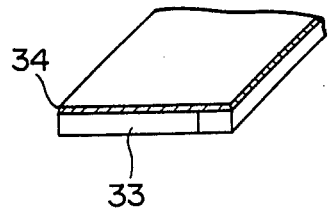
Figure 5C:
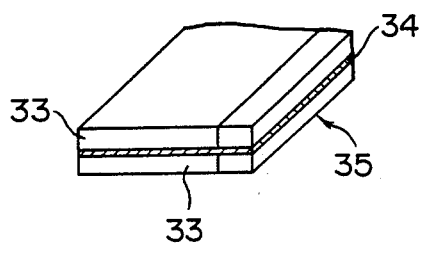
Figure 5D:
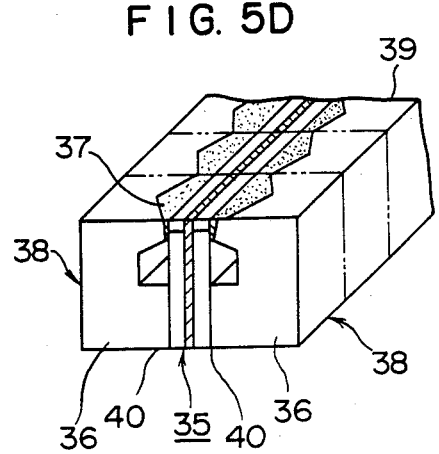
Figure 5E:
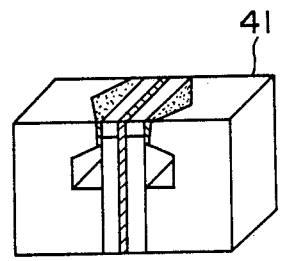

By using the Fe-1.6 wt% Ni alloy thin film according to the present invention or a permalloy (Ni-19 at% Fe) alloy thin film which is a conventional material in practical use, a single pole type magnetic head 41 for perpendicular magnetic recording having a structure as shown in FIG. 5E was fabricated. The fabrication process of this magnetic head 41 will now be described.

On a surface of a substrate 33 composed of Mn-Zn ferrite 31 and high melting point glass 32 as shown in FIG. 5A, the above described alloy ferromagnetic thin film 34 having the film thickness of 0.2 μm was formed as shown in FIG. 5B by using the RF sputtering method. Further, a glass film containing Pb for bonding was formed on the ferromagnetic thin film 34 by the RF sputtering method. Another substrate 33 as shown in FIG. 5A was layed on top of the glass film and heated at 450° C. for 30 minutes. The above described glass film containing Pb was thus melted and fixed to form a main pole block 35 as shown in FIG. 5C. And an auxiliary core block 38 composed of Mn-Zn ferrite 36 and high melting point glass 37 as shown in FIG. 5D was prepared. After the glass film containing Pb for bonding similar to that described above had been formed on the bonding face 40, the main pole block 35 was put between bonding faces 40 of the auxiliary core blocks 38 and heated at 450° C. for 30 minutes. The above described glass films containing Pb were thus melted and fixed to form a bonded block 39. The block 39 was cut along broken lines shown in FIG. 5D to form a magnetic head 41 of single pole type for perpendicular magnetic recording as shown in FIG. 5E.

The recording characteristics of a head using the Fe-1.6 at% Ni alloy thin film made by the above described process and of a head using the permalloy thin film were measured by using a Co-Cr perpendicular magnetic recording medium. As the reproducing head, a head using a permalloy thin film was used. As a result, the output of the head using the Fe-1.6 at% Ni alloy thin film according to the present invention was approximately 4 dB higher than the output of the head using a permalloy alloy thin film which was a conventional material in practical use. It was thus made clear that the magnetic head using the ferromagnetic thin film according to the present invention has excellent recording characteristics.

EMBODIMENT 8

Figure 6A:
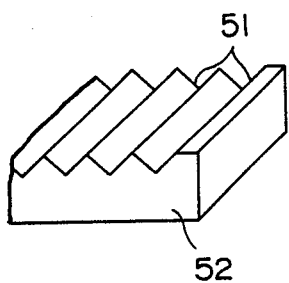
FIGS. 6A to 6F are oblique views for illustrating the production method of a magnetic head to show another embodiment of the present invention.
Figure 6B:
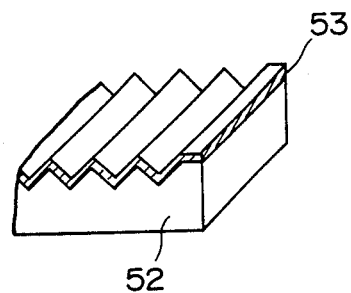
Figure 6C:
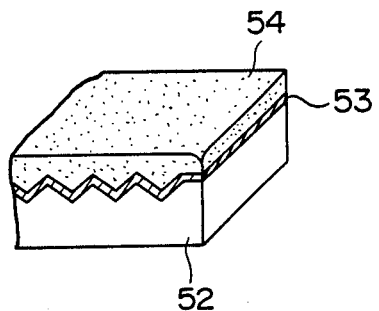
Figure 6D:
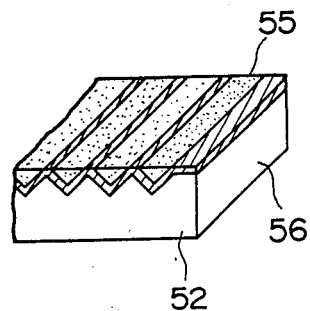
Figure 6E:
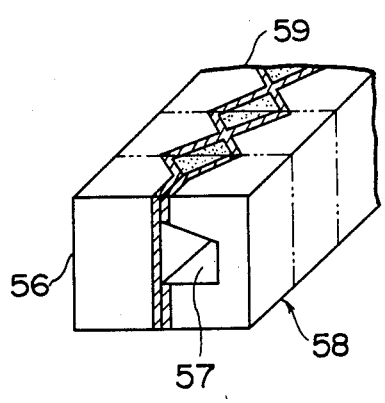
Figure 6F:
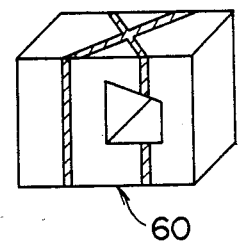

By respectively using the Fe-1.6 at% Ni alloy thin film according to the present invention and a thin film of a Fe-Al-Si alloy (Fe-6 wt% Al-9.5 wt% Si) which was a conventional material in practical use, a magnetic head 60 for VTR as shown in FIG. 6F was fabricated. The fabrication process of the magnetic head 60 will now be described.

A substrate 52 composed of Mn-Zn ferrite having grooves 51 as shown in FIG. 6A was prepared. As shown in FIG. 6B, the above described ferromagnetic thin film 53 was so formed on the surface of the substrate 52 as to have film thickness of approximately 10 μm by using the RF sputtering method. Subsequently, the grooves 51 were filled with Pb containing glass 54 as shown in FIG. 6C. As shown in FIG. 6D, the surface of Pb containing glass was ground to generate a gap forming face 55. A head core half-block 56 was thus fabricated. As a gap material, an SiO₂ film was formed on the gap forming face 55 by the sputtering method. As shown in FIG. 6E, a head core half-block 58 having a winding window 57 and the above described head core half-block 56 are overlapped with one another via a gap material and heated at temperature of 600° C. for 30 minutes. The Pb containing glass 54 was melted and solidified again to form a bonded block 59. The bonded block 59 was cut along broken lines as shown in FIG. 6E to form a magnetic head 60 for VTR as shown in FIG. 6F.

The recording characteristics of a head using the Fe-1.6 at% Ni alloy thin film made by the above described process and a head using the Fe-Al-Si alloy thin film were measured by using metal tape having coercive force of 1,400 Oe. As the reproducing head, a ferrite head was used. As a result, the output of a head using the Fe-1.6 at% Ni alloy thin film was approximately 4 dB higher at the frequency of 1 MHz than the output of a head using a Fe-Al-Si alloy thin film which was a conventional material in practical use. In this way, it was made clear that the magnetic head using the ferromagnetic thin film of the present embodiment had excellent recording characteristics.

EMBODIMENT 9

By using a ferromagnetic thin film according to another embodiment of the present invention, the magnetic head for perpendicular magnetic recording as shown in FIG. 5E was fabricated as an example of a magnetic head. As the main pole film, a laminate film comprising Fe₉₇Rh₃ and permalloy of the present invention described with reference to the embodiment 6 and a single layer film comprising Fe₉₇Rh₃ were used. Further, a head having Fe as the main pole film was also fabricated for the purpose of comparison. The thickness of the main pole film was chosen to be 0.3 μm. The recording and reproducing characteristics of this head fabricated in the trial manufacture were measured by using a Co-Cr medium for perpendicular magnetic recording. As a result, the output of the head having a Fe₉₇Rh₃ single-layer film as the main pole film was approximately 2 dB higher than the output of the head having a Fe film as the main pole film. And the output of the head having the laminate film comprising Fe₉₇Rh₃ and permalloy as the main pole film was approximately 4 dB higher than the output of the head having a Fe film as the main pole film. The effect obtained by using the ferromagnetic thin film of the present invention was thus confirmed. Such an effect of improvement in magnetic head characteristics was confirmed not only in the composition of Fe₉₇Rh₃ of the present embodiment but also in other composition of the present invention. The ferromagnetic thin film of the present invention exhibits the excellent effect not only when it is used in the magnetic head of the present embodiment but also when it is used in a thin film magnetic head, a magnetic head for VTR, and the like. Further, the ferromagnetic thin film of the present invention can be used not only for magnetic heads but also for application demanding a high saturation flux density, a low magnetostriction constant, a low coercive force, high permeability and high corrosion resistance. Examples of such application include a magnetic pole film for bubble transfer in the magnetic bubble device, an underlayer of a double-layer film medium for perpendicular magnetic recording, and a shield film of a magnetic head using the MR effect.

Even in case where a small amount of inevitable impurities are included in the ferromagnetic thin film, the effect of the present invention is maintained.

As described above, at least one selected from the group consisting of Co, Ni, Ru, Rh, Pd, Os, Ir and Pt is added to Fe in an appropriate amount in the ferromagnetic thin film according to the present invention. Thereby, it becomes possible to obtain a ferromagnetic thin film having an extremely high saturation flux density, a magnetostriction constant close to zero, and excellent corrosion resistance. It is apparent that a magnetic head using such a ferromagnetic thin film has excellent head characteristics.

We claim:

1. A ferromagnetic thin film having a high saturation magnetic flux density of not less than 18 KG, a magnetostriction constant close to zero, excellent corrosion resistance, and containing Fe as a main component and at least one additive element selected from the group consisting of Co, Ni, Ru, Rh, Pd, Os, Ir and Pt, in which the total content of said at least one additive element is not less than 0.1 at%, and additive contents a, b, c, d, e, f, g and h (at%) respectively of said Co, Ni, Ru, Rh, Pd, Os, Ir and Pt satisfy $$\frac{a}{4} + \frac{b}{3.5} + \frac{c}{10} + \frac{d}{7} + \frac{e}{13} + \frac{f}{11} + \frac{g}{8} + \frac{h}{2.5} < 1.$$

2. A ferromagnetic thin film according to claim 1, wherein said additive contents a, b, c, d, e, f, g and h (at%) respectively of said Co, Ni, Ru, Rh, Pd, Os, Ir and Pt satisfy.

$$a + \frac{b}{0.5} + \frac{c}{2} + \frac{d}{1.4} + \frac{e}{0.5} + \frac{f}{1.5} + \frac{g}{1.6} + \frac{h}{0.5} \geq 1$$

and $$\frac{a}{3} + \frac{b}{2.6} + \frac{c}{7} + \frac{d}{4.6} + \frac{e}{7} + \frac{f}{8} + \frac{g}{5} + \frac{h}{2} \leq 1.$$

3. A ferromagnetic thin film according to claim 1, wherein said ferromagnetic thin film comprises a sputtered film.

4. A ferromagnetic thin film according to claim 1, wherein said ferromagnetic thin film is used as a main magnetic thin film and is laminated alternately with an intermediate layer of a magnetic material having other composition or a non-magnetic material.

5. A ferromagnetic thin film according to claim 4, wherein said main magnetic film is in the range from 0.02 to 0.5 μm in film thickness per layer, and said intermediate layer is in the range from 20 to 500 Å in film thickness per layer.

6. A ferromagnetic thin film according to claim 1, wherein said at least one additive element is Ni, the content of Ni ranging from 0.5 to 2.6 at%.

7. A ferromagnetic thin film according to claim 1, wherein said at least one additive element is at least two additive elements selected from the group consisting of Co, Ni, Rh, Pd, Os, Ir and Pt.

8. A ferromagnetic thin film according to claim 1, wherein said at least one additive element is at least two additive elements selected from the group consisting of Ni, Ru, Rh, Pd, Os, Ir and Pt.

9. A ferromagnetic thin film according to claim 1, wherein said additive element is at least one additive element selected from the group consisting of Ni, Rh, Pd, Os, Ir and Pt.

10. A ferromagnetic thin film according to claim 1, wherein said ferromagnetic thin film has a magnetostriction constant $\lambda_s$ such that $|\lambda_s| < 4 \times 10^{-6}$.

11. A ferromagnetic thin film according to claim 1, wherein said ferromagnetic thin film has a magnetostriction constant $\lambda_s$ such that $|\lambda_s| \leq 2 \times 10^{-6}$.

12. A ferromagnetic thin film according to claim 1, wherein said ferromagnetic thin film has a magnetostriction constant $\lambda_s$ such that $|\lambda_s| \leq 1 \times 10^{-6}$.

13. A ferromagnetic thin film having a high saturation magnetic flux density of not less than 18 KG, a magnetostriction constant close to zero, excellent corrosion resistance, and containing Fe as a main component, at least one first additive element selected from the group consisting of Co and Ni, and at least one second additive element selected from the group Ru, Rh, Pd, Os, Ir and Pt, in which the total content of said at least one second additive element is not less than 0.1 at%, and additive contents a, b, c, d, e, f, g and h (at%) respectively of said Co, Ni, Ru, Rh, Pd, Os, Ir and Pt satisfy $$\frac{a}{4} + \frac{b}{3.5} + \frac{c}{10} + \frac{d}{7} + \frac{e}{13} + \frac{f}{11} + \frac{g}{8} + \frac{h}{2.5} < 1.$$

14. A ferromagnetic thin film according to claim 13, wherein said additive contents a, b, c, d, e, f, g and h (at%) respectively of said Co, Ni, Ru, Rh, Pd, Os, Ir and Pt satisfy.

$$a + \frac{b}{0.5} + \frac{c}{2} + \frac{d}{1.4} + \frac{e}{0.5} + \frac{f}{1.5} + \frac{g}{1.6} + \frac{h}{0.5} \geq 1$$

and $$\frac{a}{3} + \frac{b}{2.6} + \frac{c}{7} + \frac{d}{4.6} + \frac{e}{7} + \frac{f}{8} + \frac{g}{5} + \frac{h}{2} \leq 1.$$

15. A ferromagnetic thin film according to claim 13, wherein said ferromagnetic thin film has a magnetostriction constant $\lambda_s$ such that $|\lambda_s| < 4 \times 10^{-6}$.

16. A ferromagnetic thin film according to claim 13, wherein said ferromagnetic thin film has a magnetostriction constant $\lambda_s$ such that $|\lambda_s| \leq 2 \times 10^{-6}$.

17. A ferromagnetic thin film according to claim 13, wherein said ferromagnetic thin film has a magnetostriction constant $\lambda_s$ such that $|\lambda_s| \leq 1 \times 10^{-6}$.

18. A magnetic head using a ferromagnetic thin film in at least a part of a magnetic circuit thereof, wherein said ferromagnetic thin film has a high saturation magnetic flux density of not less than 18 KG, a magnetostriction constant close to zero, excellent corrosion resistance, and contains Fe as a main component, and at least one additive element selected from the group consisting of Co, Ni, Ru, Rh, Pd, Os, Ir and Pt, in which the total content of said at least one additive element is not less than 0.1 at%, and additive contents a, b, c, d, e, f, g and h (at%) respectively of said Co, Ni, Ru, Rh, Pd, Os, Ir and Pt satisfy $$\frac{a}{4} + \frac{b}{3.5} + \frac{c}{10} + \frac{d}{7} + \frac{e}{13} + \frac{f}{11} + \frac{g}{8} + \frac{h}{2.5} < 1.$$

19. A magnetic head according to claim 18, wherein said additive contents a, b, c, d, e, f, g and h (at%) respectively of said Co, Ni, Ru, Rh, Pd, Os, Ir and Pt satisfy $$a + \frac{b}{0.5} + \frac{c}{2} + \frac{d}{1.4} + \frac{e}{0.5} + \frac{f}{1.5} + \frac{g}{1.6} + \frac{h}{0.5} \geq 1$$

and $$\frac{a}{3} + \frac{b}{2.6} + \frac{c}{7} + \frac{d}{4.6} + \frac{e}{7} + \frac{f}{8} + \frac{g}{5} + \frac{h}{2} \leq 1.$$

20. A magnetic head according to claim 18, wherein said ferromagnetic thin film comprises a sputtered film.

21. A magnetic head according to claim 18, wherein said ferromagnetic thin film is used as a main magnetic thin film and is laminated alternately with an intermediate layer of a magnetic material having other composition or a non-magnetic material.

22. A magnetic head according to claim 21, wherein said main magnetic film is in the range from 0.02 to 0.5 μm in film thickness per layer, and said intermediate layer is in the range from 20 to 500 Å in film thickness per layer.

23. A ferromagnetic thin film according to claim 18, wherein said ferromagnetic thin film has a magnetostriction constant $\lambda_s$ such that $|\lambda_s| < 4 \times 10^{-6}$.

24. A ferromagnetic thin film according to claim 18, wherein said ferromagnetic thin film has a magnetostriction constant $\lambda_s$ such that $|\lambda_s| \leq 2 \times 10^{-6}$.

25. A ferromagnetic thin film according to claim 18, wherein said ferromagnetic thin film has a magnetostriction constant $\lambda_s$ such that $|\lambda_s| \leq 1 \times 10^{-6}$.

* * * * *